United States Patent [19]
Beaver, Jr. et al.

[11] Patent Number: 5,372,429
[45] Date of Patent: Dec. 13, 1994

[54] SEALABLE AND REUSABLE POUCH

[75] Inventors: Donald L. Beaver, Jr., Bellwood, Pa.; Robert W. Duncan, Wheaton, Ill.; Michael T. Kinney, Dysart, Pa.; John M. Woody, Auburn, Mich.

[73] Assignee: Dow Corning Corporation, Midland, Mich.

[21] Appl. No.: 959,865

[22] Filed: Oct. 13, 1992

[51] Int. Cl.$^5$ ............................................. B65D 30/08
[52] U.S. Cl. .................................. 383/109; 383/117; 206/524.3; 206/524.4; 206/524.5
[58] Field of Search ..................... 383/109, 110, 117; 206/204, 524.2, 524.3, 524.4, 524.5

[56] References Cited

U.S. PATENT DOCUMENTS

| | | | |
|---|---|---|---|
| 3,999,653 | 12/1976 | Haigh et al. | 206/524.5 X |
| 4,019,628 | 4/1977 | Derby | 206/524.4 X |
| 4,573,578 | 3/1986 | Greminger, Jr. et al. | 206/524.4 |
| 4,756,937 | 7/1988 | Mentzer | 206/524.3 X |
| 4,927,010 | 5/1990 | Kannankeril | 206/204 |
| 4,969,750 | 11/1990 | Russo et al. | 383/117 X |
| 5,160,025 | 11/1992 | Greenawald | 206/204 X |

Primary Examiner—Allan N. Shoap
Assistant Examiner—Jes F. Pascua
Attorney, Agent, or Firm—Timothy J. Troy

[57] ABSTRACT

The present invention relates to a packaging or shipping pouch having cushioning and absorbent material located therein. The pouch of this invention has an outer bag which has a closed lower end and an open, sealable upper end. Inside the outer bag is located a fabric inner bag having a closed lower end and an open upper end, the fabric inner bag is attached to the outer bag near the upper end of both bags. The outer bag additionally contains a cushioning and absorbent material. The fabric inner bag is movably contained within the cushioning and absorbent material of the outer bag.

8 Claims, 3 Drawing Sheets

SEALABLE AND REUSABLE POUCH

BACKGROUND OF THE INVENTION

The present invention relates to a sealable, reusable pouch. More particularly the present invention relates to a packaging or shipping pouch having cushioning and absorbent material located therein.

It is desirable to have absorbent material inside of the bag or pouch in case of rupture of the bag or failure of the inner container so that materials located therein do not immediately spill out upon such rupture or failure, especially if hazardous type materials are located in the shipping bag. It is also desirable to have an absorbent material inside of the bag or pouch in case of rupture of the bag so that the materials located therein do not immediately spill out upon rupture, again especially if the materials are hazardous chemicals, etc.

A variety of bags, pouches, devices, and the like have been developed to cushion and protect objects located therein against damage from the elements, shock from dropping of the bag, etc. during the transportation and shipping of the object. For Example, U.K. Patent Application No. 2,085,401A discloses a composite bag for the vacuum packing of a product consisting of an inner bag made of a flexible plastic material and disposed within an outer bag made of metallic foil disposed between two foils of plastics material. In the '401A reference the inner bag is filled with the product to be packed and then is evacuated, and the inner and outer bags are then welded together along a seam. The '401A reference also discloses that when the composite bag is closed, air or an inert gas is confined in the space between the inner and outer bags, this air or inert gas acting as a cushion for protecting the packed product against damage and it is further disclosed that the inner bag is waterproof and the outer bag is gas proof and opaque. A cushioned bag was also described in U.S. Pat. No. 4,868,025 to Strzelewicz which discloses a cushioned bag having two adjacent multilayered sections, each section comprising an outer layer of flexible, tear-resistant, spun-bonded linear polyethylene fiber thermoplastic sheet material, a middle layer of polyolefin film, and an inner layer of flexible, thermoplastic sheet cushioning material, the sections being fused together along at least one edge of the bag to form a seamed edge comprising a fused bead.

Another bag developed to cushion and protect objects is disclosed in U.S. Pat. No. 4,997,289 to Sasaki et al. which teaches an overtape-sealed bag comprising a paper tube, having longitudinally opposite open ends, at least one of which is covered and sealed with a bifold overtape, the overtape is lined with a synthetic resin sheet which is bonded to an outer surface of the paper tube proximate an open end thereof with adhesive having penetrated an outermost layer of the paper tube so that a release resistance is established between the overtape and the outermost layer of the paper tube which is higher than a release resistance established between the overtape and an inner layer of the paper tube not penetrated by said adhesive. The unsealing of the bag in the '289 patent can occur between the outermost layer and the inner layer or along the inner layer itself. The '289 patent teaches that the paper bag has significantly improved rupture resistance and is sealed with high safety for transport and storage but ready for unsealing. Another device for cushioning an object is described in U.S. Pat. No. 5,009,318 which teaches a device for cushioning an object having a quantity of granular material located in a retaining element which is divided into compartments which contain the quantity of granular material, the retaining element and granular material being located within an inner volume of a sealed housing. The '318 patent further discloses that the retaining element is made from a material that is permeable to gas but impermeable to the granular materials, while the sealed housing is made from a material that is impermeable to gas. The '318 patent further teaches that the object to be maintained is actually placed inside the sealed housing, directly in the granular material.

Bags, pouches, devices, and the like have also been developed to contain absorbent material located therein so that spillage or leakage of the fluids placed in the bag is prevented during the transportation and shipping of the material. For Example, Aoyama in U.K. Patent Application No. 2,117,736A teaches a container for liquid comprising an outerbox made of cardboard having a rectangular parallel piped shape when set up and flat when folded, and an inner bag made of a polymer film or sheet, the film or sheet of the inner bag being folded inwardly at the sides and at least the top and bottom ends thereof being sealed to thereby expand into a rectangular parallel piped shape to fit into the side of said outer box when filled with liquid, and being folded flat when empty. Another bag containing absorbent material is described in U.S. Pat. No. 4,861,632 to Caggiano which discloses a sealed bag container formed from laminated packaging material so that a dry environment may be maintained, comprising an outer imperforate moisture impervious layer defining an interior within, a middle moisture absorbent layer within said interior, an inner perforated moisture impervious layer. U.S. Pat. No. 4,890,936 to Cooper discloses a waste bag made of synthetic thermoplastic plastic material having an inner bag made of liquid-absorbent material which constitutes an internal lining of the waste bag, in which the mouth of the inner bag is spaced from the mouth of the waste bag, so that the internal lining terminates inwardly of the mouth of the waste bag so that the latter is free of lining in the region of its mouth to enable that region to be gathered and tied. The mouth of the inner bag is heat sealed to the synthetic thermoplastic plastic material of the waste bag.

SUMMARY OF THE INVENTION

It is an object of this invention to provide a pouch having absorbent material inside so that in case of rupture of the bag or failure of the inner container, the materials located therein do not immediately spill out upon rupture or failure. It is also an object of this invention to provide a pouch having an absorbent material inside so that in case of rupture of the bag the materials located therein do not immediately spill out upon rupture. It is an additional object of this invention to provide a pouch which will cushion and maintain a body located therein and also maintain a dry environment for the body. According to the invention the object to be cushioned is placed inside the pouch resting against a fabric inner bag, the pouch having absorbent material located therein, the absorbent material being located inside a plastic outer bag (the exterior of the pouch) and around the fabric inner bag. The material can thus adopt the outline of the object and cushion it. The pouch of the present invention also has the advantage of supporting an object even if movement of the bag occurs as the inner bag is movably contained within the absorbent and cushioning material. The use of a fabric inner bag movably contained within cushioning and absorbent material enables the pouch to withstand the severe shock or impact from dropping, bumping, etc. since the inner bag and cushioning material absorbs most of the force involved. Thus the pouch of the present invention is advantageous over those known in the art in that the pouch provides support, cushioning against impact or shock, and all types of absorbent capabilities in case of leakage or spillage of contents located in the pouch, all in a single package. The pouch thus provides high safety for materials during transportation and storage of the materials. An additional advantage of the pouch is the easy openability and closability of the pouch as one end of said pouch may contain a zipper-like closure, an adhesive seal, or other seals.

BRIEF DESCRIPTION OF THE DRAWINGS

The above and the objects of the invention will be seen by reference to the detailed description of the invention taken in connection with the accompanying drawings, in which.

DETAILED DESCRIPTION OF THE INVENTION

Figure 2:
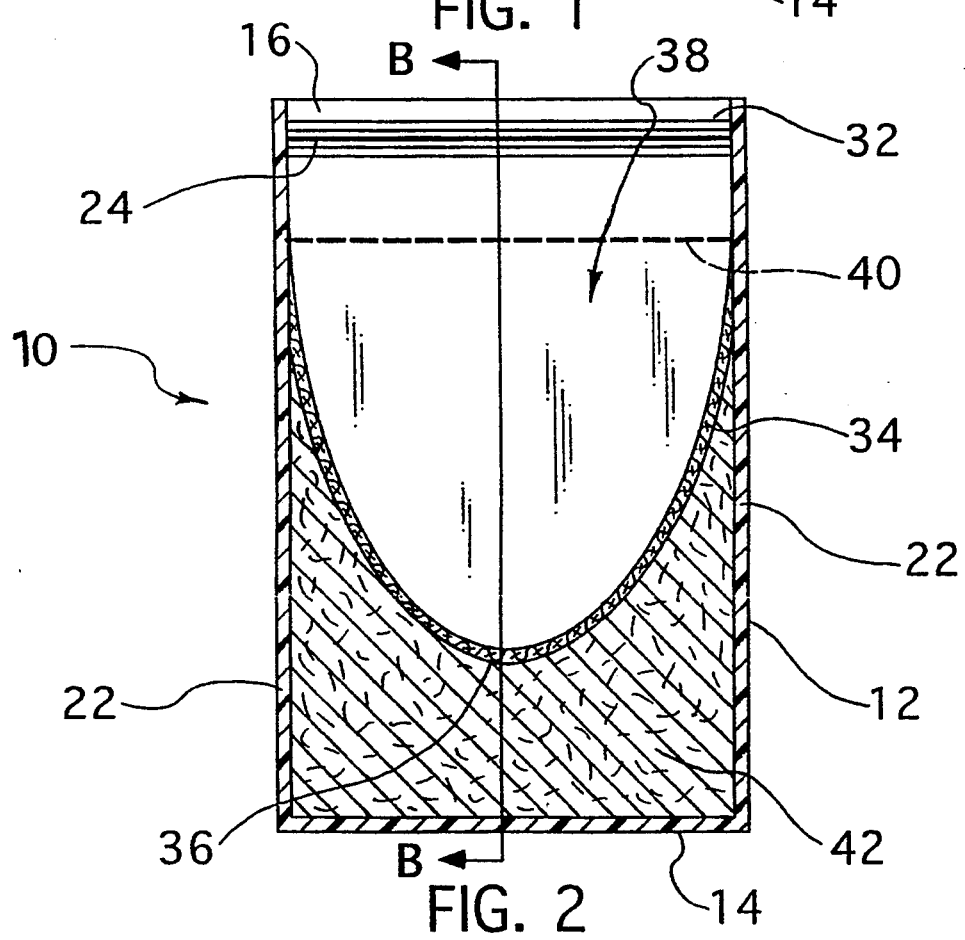
FIG. 2 is a cross-sectional view of a preferred embodiment of a sealable pouch taken along reference line AA of FIG. 1 in accordance with the present invention.
Figure 3:
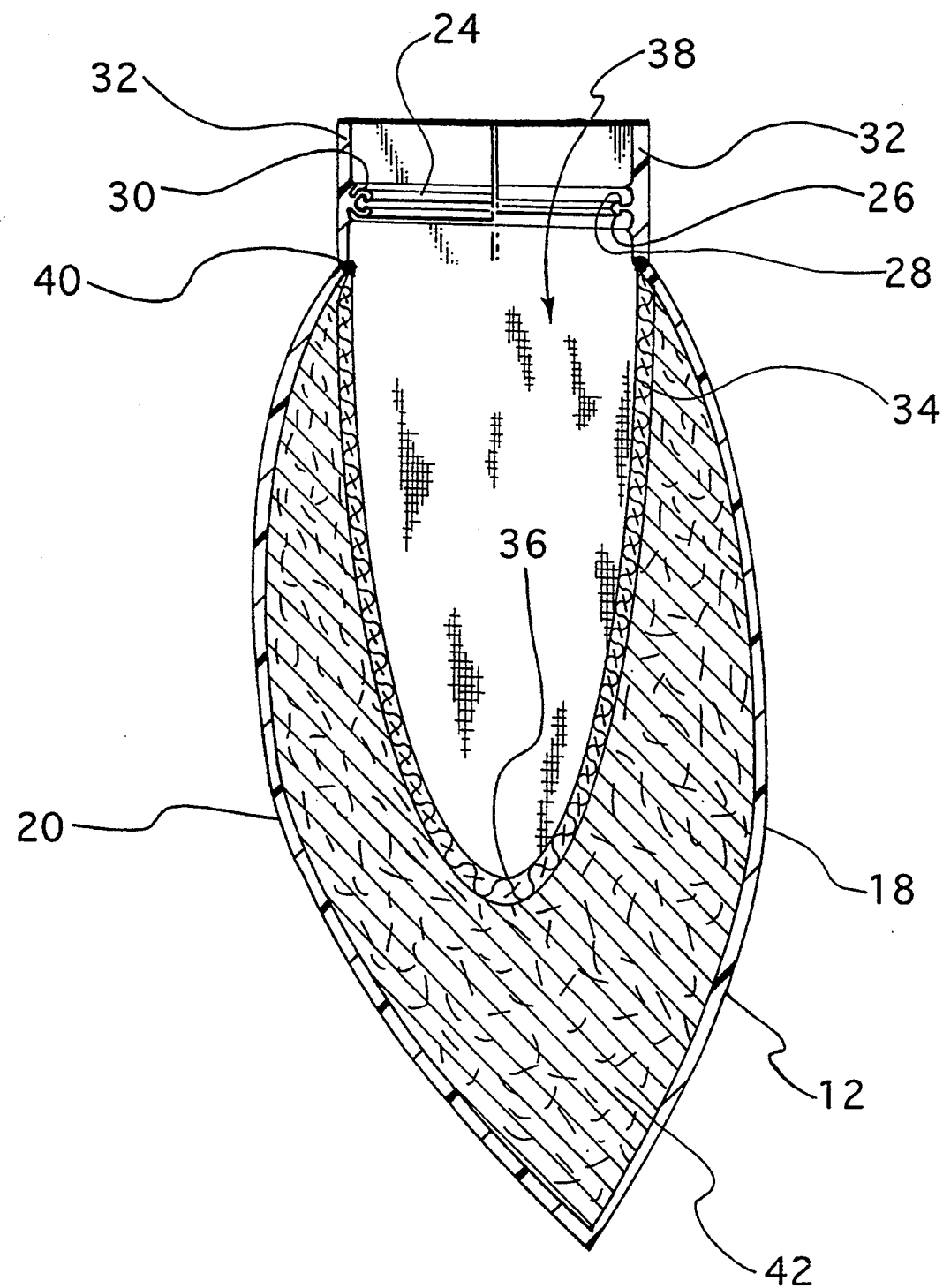
FIG. 3 is an enlarged cross-sectional view of the pouch taken along reference line BB of FIG. 2 showing a plastic outer bag having an inner bag.

Considering the drawings in greater detail, FIG. 2 shows a pouch (10) of the present invention comprising an outer bag (12) having a closed lower end (14) and an open sealable upper end (16) formed of a flexible waterproof and chemical proof material such as plastic, cloth, foil, or treated paper. The pouch (10) can have a size such that it can hold a volume of up to about a 60 liter (16 gallon) object or container. The outer bag (12) is preferably made of polyethylene, polypropylene, a polyamide such as nylon, polyester, Teflon, polyurethane, or a metal foil such as aluminum. It is highly preferred for the present invention that the outer bag (12) be composed of a strong liquid-impervious plastic material. The outer bag (12) is preferably formed of a monolayer (or multilayer, or laminated) plastic material having inner surfaces which are heat sealable so that the sides (18) and (20) thereof can be heat sealed about their edges (22) and heat sealed at closed lower end (14) to form a bag enclosure. The material is preferably heat sealed to form the closed lower end (14) of outer bag (12). However sides (18) and (20), and closed lower end (14) can be sealably attached together by any suitable means such as stitching, crimping, or use of an adhesive. The inner surface of the outer bag (12) to be sealed is preferably an ethylene homopolymer or copolymer or blends thereof, or can be formed of other heat sealable resins or coatings. Adhesive coatings can be included to form the actual heat seals described above. Adhesive polymeric blends such as ethylene vinyl acetate (EVA) copolymer can be used to coat the inside of outer bag (12), as well as other well known adhesive polymeric materials such as ethylene acrylic acid (EEA) copolymer resins. The outer bag (12) preferably has a thickness of between 1.0 and 10.0 mils (millimeters), with a preferred thickness of 4.0 mils. The function of outer bag (12) is to provide water proof properties, gas proof properties, and to contain cushioning and absorbent material ((42) in FIG. 2) described hereinbelow. It is preferred for purposes of the present invention that the outer bag (12) is opaque so that the product contained therein is protected from light. The open upper end (16) of outer bag (12) is sealable by any suitable means for closure of the upper end of the outer bag. Sealable for purposes of the present invention includes Zip-lock(R) type seals, peel seals, twist ties, Velcro(R) seals, string ties, plastic ties, heat seals, adhesive bonding, double-face adhesive means, high-frequency welding, sewn, stitched, or crimped seals. The preferred type of sealing for outer bag (12) of the present invention is a Zip-Lock seal. Bags with zipper-like closures which are reclosable are well known. FIG. 2 illustrating a preferred embodiment of the present invention shows a conventional reclosable fastener (24) (Zip-Lock) such as that illustrated in European Patent Application No. 239,319 A2 and incorporated herein by reference, located across sealable open upper end (16) of outer bag (12), the reclosable fastener (24) being positioned so as to close the upper end of the pouch (10) above an object contained therein. FIG. 3 shows the reclosable fastener (24), the fastener having a male fastener element (26) with ribs (28) on either side thereof and a female fastener element (30) for engagement with male fastener (26). The open upper end of the pouch (10) may include gripping flanges (32) which are used to separate reclosable fasteners such as those described hereinabove, as well as pull apart peel-type seals.

Figure 1:
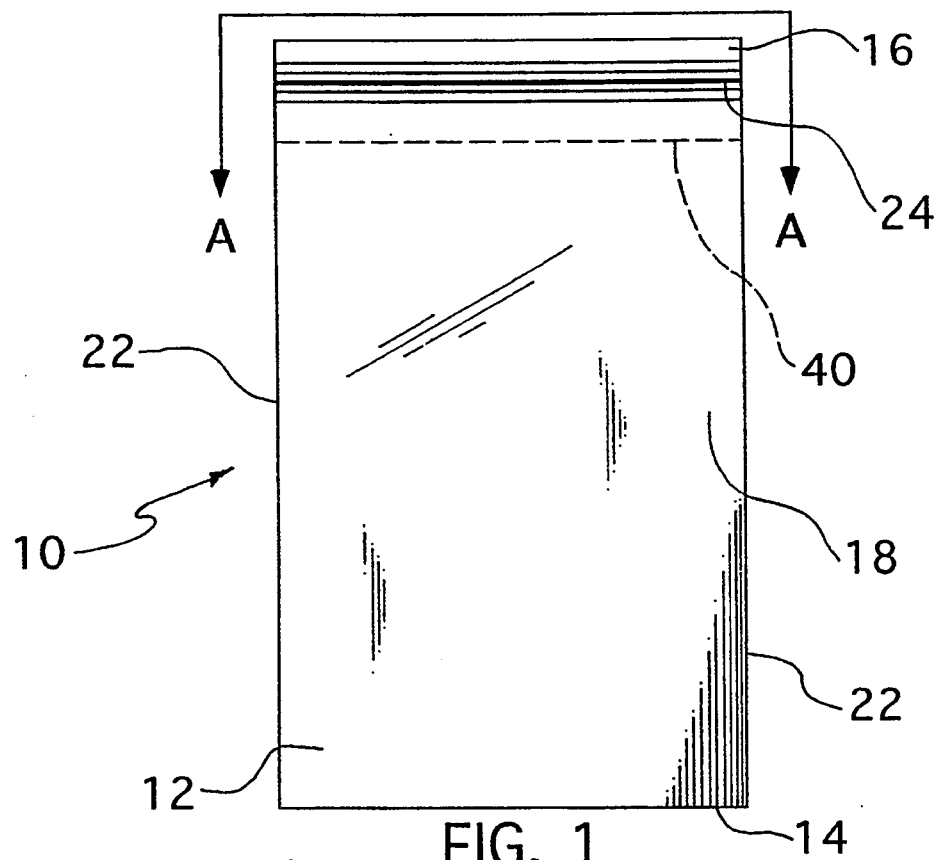
FIG. 1 is an elevational view from the side of a pouch of the present invention.

FIG. 2 shows that pouch (10) further comprises a fabric inner bag (34) having a closed lower end (36) and an open upper end (38) and is attached to the outer bag (12) near their upper ends. The closed lower end of the fabric inner bag (36) is unattached as shown in FIG. 2 and FIG. 3. More particularly, referring to FIG. 2, the fabric inner bag (34) is stitched to the outer bag (12) along seam (40) which is located immediately below (about 0.5 inches below) the reclosable fastener (24) described hereinabove (and also shown in FIG. 1). "Attached" according to the present invention includes sewn, stitched, heat sealed, or fastened by an adhesive. It is highly preferred for the present invention that the fabric inner bag (34) be stitched to the outer bag (12). The outer bag (12) described hereinabove is larger than the fabric inner bag (34) such that the fabric inner bag (34) is disposed inside the outer bag (12). "Fabric" according to the present invention denotes any type of textile fabric. Examples of fabrics which are suitable for use as the fabric inner bag (34) of the present invention include broadwovens, narrowwovens, non-wovens, knits, cellulose, manmade fibers, spunbonded fabrics, Nomex (R), Kevlar (R) (cellulose and polyester threaded cloth from Dupont Corp., Newark, Del. 19714), cotton, wool, nylon, and polyester and other like materials. It is preferred that the fabric inner bag (34) of the present invention be made of Confil (R) (cellulose and polyester threaded cloth from Veratec Co., Walpole, Mass. 02081) or Sontara (R) (cellulose and polyester threaded cloth from Dupont Corp., Newark, Del. 19714) cloth. Fabric inner bag (34) preferably has a thickness between 0.005 and 0.050 inches, with a preferred thickness of 0.010 inches. The function of the fabric inner bag (34) in pouch (10) of the present invention is to contain and support contents placed therein (i.e. the product container or "Primary Container"). It is also highly desirable for the fabric inner bag (34) to be composed of a moisture permeable material so that liquid can flow through it and be absorbed by the cushioning and absorbent material (42) described hereinbelow.

FIG. 2 and FIG. 3 also show that pouch (10) also comprises a cushioning and absorbent material (42) which is located in outer bag (12). As is shown in FIGS. 2 and 3, in a preferred embodiment of the present invention the cushioning and absorbent material (42) is located between the closed lower end (36) of fabric inner bag (34) and the closed lower end (14) of outer bag (12). A very important aspect of the instant invention is that except for seam (40), the fabric inner bag (34) is movably contained within the cushioning and absorbent material (16). "Movably Contained" according to the present invention denotes that except for seam (40), fabric inner bag (34) can shift or move anywhere within outer bag (12). This allows the "product container" placed in pouch (10) to thus adopt the outline of the "product container" and cushion it. Therefore the pouch of the present invention also has the advantage of supporting an object even if movement of the bag occurs as the cushioning material will conform to the outline of the object and support and cushion it in whatever direction the object may be moved. The use of a fabric inner bag movably contained within cushioning and absorbent material also enables the pouch to withstand the severe shock or impact from dropping, bumping, etc. since the fabric of the inner bag and the cushioning material absorb most of the force involved. Thus the cushioning and absorbent material (42) functions as a support for the fabric inner bag (34). The cushioning and absorbent material (42) includes any material that can concurrently function as an absorbent and as a cushioning agent. Examples of materials suitable for use as cushioning and absorbent material (42) in outer bag (12) include cellulose (shredded recycled newspaper), vermiculite (any of various micaceous minerals that are hydrous silicates resulting usually from expansion of the granules of mica at high temperatures to give a lightweight highly water- and chemical-absorbent material), wood ash, peat moss, wood chips, silicate particulate, clay, diatomacious earth, ground corn cob, dry powdered cement, neutralizers such as citric acid and sodium sesquicarbonate, KIM-PAK(R) (cellulose fiber from Kimberly-Clark Corp., Neenah, Wis. 54956), JIFFY-PAK(R) (cellulose fiber from Sealed Air Corporation, Fair Lawn, N.J. 07410), super absorbent materials, shredded or crushed cork, shredded textile fabric or cloth, shredded polyethylene, shredded or blanket style polypropylene, sawdust, fiber glass, mineral wool, shredded fiberboard, shredded cardboard, shredded paperboard, lint, cotton or equivalent fabric material, gauze, any type of shredded paper such as shredded tissue paper or shredded paper towel, or a desiccant agent such as silica gel, calcium chloride, or magnesium perchlorate. It is highly preferred for the present invention that the cushioning and absorbent material is cellulose (shredded recycled newspaper). The amount of cushioning and absorbent material to be placed in the outer bag is that amount which is sufficient to provide cushioning and absorbency for the object to be placed in pouch (10). The amount of cushioning and absorbent material to be placed in outer bag (12) is dependent on the given weight and geometry of the object to be placed in the pouch (10).

The pouch of the present invention is reusable. The pouch can be used subsequent to its initial use for objects of like size. Thus the pouch of the instant invention has the advantage of being reusable.

Figure 4:
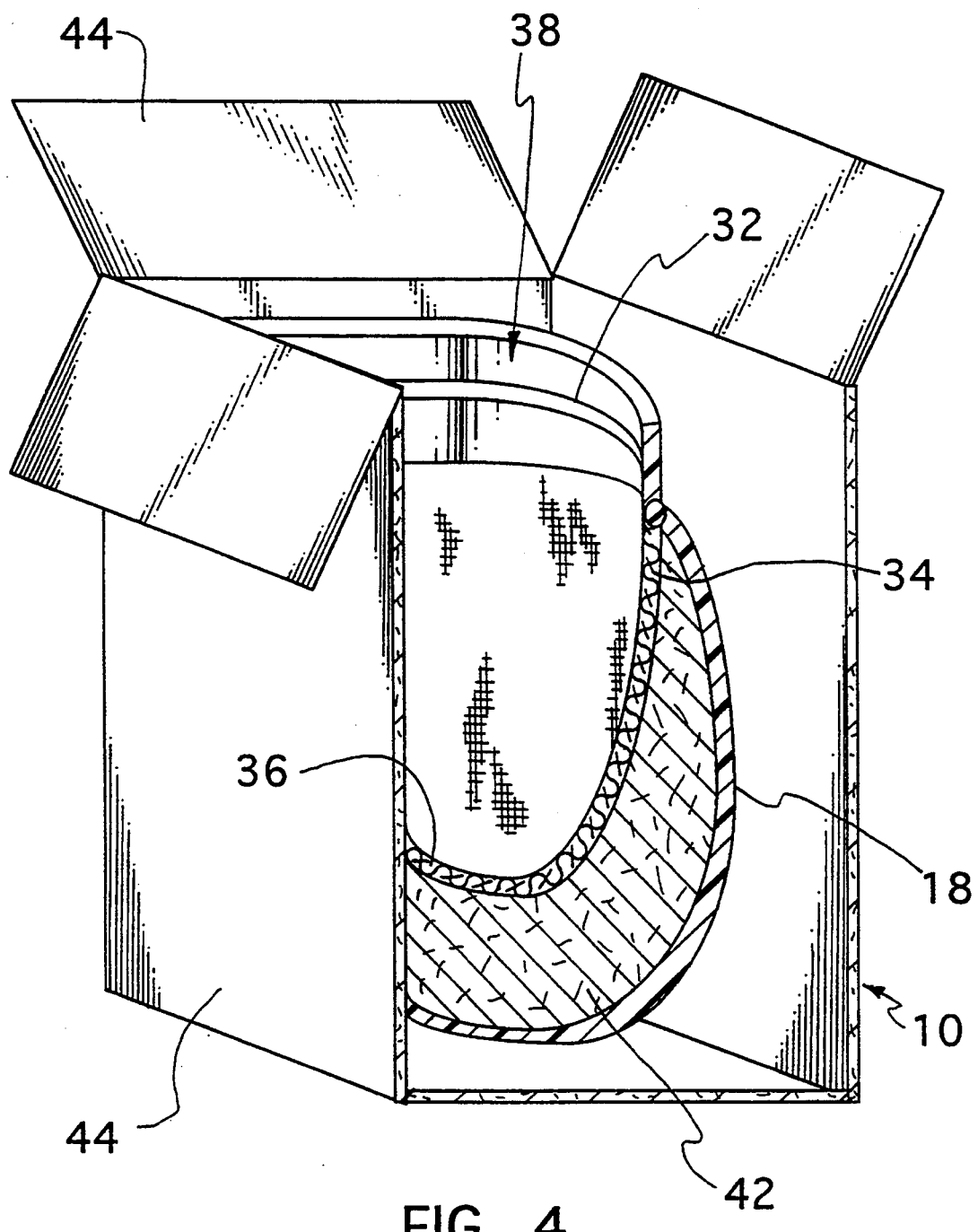
FIG. 4 is a cross-sectional view of a sealable pouch contained within a sealable fiberboard container.

The present invention is further related to a shipping and mailing package comprising in combination a sealable fiberboard container containing there in a pouch of the instant invention. FIG. 4 shows the pouch (10) contained within fiberboard container (44).

The combination of the fabric inner bag and the cushioning and absorbent material provide a pouch which is resistant to shock or impact and thereby is highly safe for transportation and shipping of objects placed therein. Furthermore, the material placed in the outer bag is absorbent and in the unlikely event that there is damage to the container having a liquid product inside of it, there is unlikely to be excessive seepage of the fluid due to the fabric inner bag and the absorbent material in the outer bag. The pouch of the present invention is designed for Packing Group II type products which is medium danger products as defined by United States Department of Transportation (USDOT) regulations and by United Nations (UN) Recommendations on the Transport of Dangerous Goods. The pouch of the present invention can be used to transport or ship hazardous materials such as Flammable liquids.

Examples of articles that can be placed in pouch (10) of the present invention include glass bottles, double friction cans (such as paint cans), plastic bottles, cone top cans (such as brake fluid cans), plastic tubs (pails), film type bottles and containers, testtubes, blood samples, urine samples, and foil pouches but is not limited thereto.

EXAMPLE 1

The pouch of the present invention was subjected to several tests which are described hereinbelow. These tests illustrate the advantages of the present invention. The tests performed on the pouch of this invention were a Drop Test, a Stacking Test, and a Vibration Test, and are governed by United States Department of Transportation (USDOT) regulations and by United Nations (UN) Recommendations on the Transport of Dangerous Goods.

The pouch of the present invention was subjected to a Drop Test. The purpose of a Drop Test is to assess the package's ability to withstand mechanical hazards that occur in distribution. The drop tests of the packages were performed using a Lansmont Precision Drop Tester (PDT). In a typical test, the package is placed onto a pneumatically controlled platen and raised to the desired drop height. When activated, the platen accelerates straight downward to more than 1 gram (g) and rotates out of the package fall line allowing the package to impact the base of the PDT. This procedure allows the product to drop accurately +2 degrees of desired orientation per ASTM D-775, Drop Test for Shipping Containers. This test is described in USDOT 49 CFR Subpart M, paragraph 178.603 and UN Recommendations on the Transport of Dangerous Goods 9.7.3.

The Drop Test described hereinabove was performed on a shipping package constructed according to the present invention. The pouch for this test was a 10" wide×15" long, 4 mil thick zip lock bag with cellulose fibers (recycled newspaper) contained within by the use of a Veratec(R) or Sontara(R) cloth inner bag (liner).

The pouch had an actual capacity of 16 OZ. Inside the pouch was placed a 16 ounce Round Accupor (cone top) can which was filled with water until it was 95% full. A Cap was then placed on the can. The cone top can was composed of 0.25# Electrolytic Tinplate and the Cap was a Metal Screw Cap, 1⅛" opening with aluminum foil and pulp liner and having dimensions of 210×600 mm. The pouch was then placed into a corrugated carton having the following dimensions: 5¾"×5¾"×8" (L×W×D). The entire package was then tested. In order to pass the test, each sample of the particular package type must be leakproof prior to the drops and after equilibrium has been reached between the internal and external pressures. The drop height for this test was 1.6 m. The results of the test are shown in Table I below which clearly illustrate the advantages of the shipping pouch of this invention.

TABLE I

| PACKAGE TYPE | DROP TEST SIDE DOWN | RESULTS |
|---|---|---|
| CONE TOP CAN IN | BOTTOM | PASS |
| ABSORBENT POUCH | TOP | PASS |
| IN CARTON | LONG SIDE | PASS |
|  | SHORT SIDE | PASS |
|  | CORNER | PASS |

The pouch according to the present invention was also subject to a Stacking Test. The purpose of the stack test is to determine the ability of the test sample to withstand a force applied on its top surface equivalent to the total combined weight of identical packages stacked on top of it during distribution. The height requirement for the stack test is a minimum of 3 m (10 ft), including the test sample. The duration of the stack test is 24 hours preconditioned at 23 degrees C. and 50% relative humidity. The stack test was performed on three samples. This test is described in USDOT 49 CFR Subpart M, paragraph 178.606 and UN Recommendations on the Transport of Dangerous Goods 9.7.6.

The criteria for passing the stack test is that the test sample must not leak. In composite packagings or combination packagings, there must be no leakage of the filling substance from the inner receptacle or inner packaging. No test sample must show any deterioration which could adversely affect transport safety or any distortion liable to reduce its strength or cause instability in stack of packages. In instances (such as guided load tests of drums and jerricans) where stacking stability is assessed after completion of the test, this may be considered sufficient when two filled packagings of the same type placed on each test sample maintain their position for one hour. Plastic packagings must be cooled to ambient temperature before the assessment.

The package that was Stack Tested is the exact same package that was described in the Drop Test hereinabove. A total of 3 samples from each package were submitted to a compression test of an amount equivalent to what the bottom package of a 3 meter high stack would experience. Thirteen boxes were stacked to attain a height of 3 m, the average weight per box was 1.40 kg, thus the total weight was equal to 18.28 kg. The boxes remained stacked for 24 hours. The exact stack height was 3.05 m. The results are disclosed in Table II hereinbelow. Table II shows that the pouch of the present invention passed the tests it was subjected to.

TABLE II

| PACKAGE TYPE | STACK TEST SAMPLE | ACTUAL LOAD | RESULTS |
|---|---|---|---|
| CONE TOP CAN IN | 1 | 20.41 kg | PASS |
| ABSORBENT POUCH | 2 | 20.41 kg | PASS |
|  | 3 | 20.41 kg | PASS |

The pouch of the present invention was further subjected to a Vibration Test. The package that was Vibration tested is the exact same package that was described in the Drop Test hereinabove. Each package must be capable of withstanding, without rupture or leakage, the vibration test. To perform the vibration test, three samples must be placed on a vibrating platform that has a double amplitude (peak to peak displacement) of one inch. The packages should be constrained horizontally to prevent them from falling off the platform, but must be left free to move vertically, bounce, and rotate. The test must be performed for one hour at a frequency that causes the package to bounce to such a degree that a piece of material of material of approximately 1.6 mm (0.063 inches) thickness can be passed between the bottom of any package and the platform. Immediately following the period of vibration, each package must be removed from the platform, turned on its side and observed for any evidence of leakage. A package passes the vibration test if there is no rupture or leakage from any of the packages. This test is described in USDOT 49 CFR Subpart M, paragraph 178.608.

The resonance point for the test was 4.2 Hertz. The dwell time for the test was 1 hour. The results are disclosed in Table III hereinbelow. Table III shows that the pouch of the present invention passed the tests it was subjected to.

TABLE III

| PACKAGE TYPE | VIBRATION TEST SAMPLE | RESULTS |
|---|---|---|
| CONE TOP CAN IN | 1 | PASS |
| ABSORBENT POUCH | 2 | PASS |
| IN CARTON | 3 | PASS |

EXAMPLE 2

The pouch of the present invention was again subjected to the tests described hereinabove, however the shipping package in this Example differs from the package of Example 1. The tests described hereinabove were performed on a shipping package constructed according to the present invention. The pouch for this example was a 10" wide×15" long, 4 mil thick ziplock bag with cellulose fibers (recycled newspaper) contained within by the use of a Veratec(R) or Sontara(R) cloth inner bag (liner). The pouch had an actual capacity of 16 OZ. Inside the pouch was placed a 16 ounce Round Double Friction can which was filled with water until it was 95% full. A Lid was then placed on the can. The Double Friction can was composed of 0.25# Electrolytic Tinplate and the Lid was a 0.25# Electrolytic Tinplate Double Friction Cover with No Liner. The can had dimensions of 210×600 mm. The pouch was then placed into a corrugated carton having the dimensions 5¾"×5¾"×8" (L×W×D). The entire package was then tested.

Each test (the Drop Test, Stacking Test, and Vibration Test) was performed on the pouch containing a double friction can according to the same procedures described in Example 1 hereinabove. The results are described in Tables V through VII hereinbelow. In all cases, the pouch of the present invention passed the tests it was subjected to.

The drop height for the carton containing the pouch and the double friction can was 1.6 meters. The results of the drop test for a pouch of the present invention containing a double friction can are shown in Table V hereinbelow.

TABLE V

| PACKAGE TYPE | DROP TEST SIDE DOWN | RESULTS |
|---|---|---|
| DOUBLE FRICTION | BOTTOM | PASS |
| CAN IN ABSORBENT | TOP | PASS |
| POUCH IN CARTON | LONG SIDE | PASS |
|  | SHORT SIDE | PASS |
|  | CORNER | PASS |

A total of 3 samples from each package were submitted to a compression test of an amount equivalent to what the bottom package of a 3 meter high stack would experience. 13 boxes were stacked to attain a height of 3 meters, the average weight per box was 1.40 kg, thus the total weight was equal to 18.28 kg. The boxes remained stacked for 24 hours. The exact stack height was 3.05 meters. The results of the stack test for a pouch of the present invention containing a double friction can are shown in Table VI hereinbelow.

TABLE VI

| PACKAGE TYPE | STACK TEST SAMPLE | ACTUAL LOAD | RESULTS |
|---|---|---|---|
| DOUBLE FRICTION | 1 | 20.41 kg | PASS |
| CAN IN ABSORBENT | 2 | 20.41 kg | PASS |
| POUCH IN CARTON | 3 | 20.41 kg | PASS |

The resonance point for this vibration test was 4.2 Hertz. The dwell time for the vibration test was 1 hour. The results of the stack test for a pouch of the present invention containing a double friction can are shown in Table VII hereinbelow.

TABLE VII

| PACKAGE TYPE | VIBRATION TEST SAMPLE | RESULTS |
|---|---|---|
| DOUBLE FRICTION | 1 | PASS |
| CAN IN ABSORBENT | 2 | PASS |
| POUCH IN CARTON | 3 | PASS |

Although an illustrative embodiment and modifications of this invention have been described in detail herein with reference to the accompanying drawings, it is to be understood that the invention is not limited to this precise embodiment or the described modifications, and that various changes and further modifications may be made therein by one skilled in the art without departing from the scope of the invention as defined in the appended claims.

That which is claimed is:

1. A sealable, reusable pouch, said pouch comprising:
   (a) an outer bag having a closed lower end and an open, sealable upper end;
   (b) a fabric inner bag having a closed lower end and an open upper end;
   (c) a cushioning and absorbent material located in the outer bag;
   (d) said inner bag being attached to said outer bag near their upper ends;
   (e) said lower end of the inner bag being entirely unattached; and
   (f) said inner bag being movably contained within the cushioning and absorbent material.

2. A shipping and mailing package comprising in combination a sealable fiberboard container containing therein a pouch of claim 1.

3. A pouch according to claim 1, wherein the outer bag comprises a material selected from the group consisting of polyethylene, polypropylene, nylon, polyester, Teflon, polyurethane, and metal foil.

4. A pouch according to claim 1, wherein the outer bag comprises a strong water-impervious plastic material.

5. A pouch according to claim 1, wherein the fabric inner bag is comprised of a fabric selected from the group consisting of cellulose, cotton, wool, nylon, and polyester.

6. A pouch according to claim 5, wherein the fabric is cellulose and polyester threaded cloth.

7. A pouch according to claim 1, wherein the cushioning and absorbent material is selected from a group consisting of cellulose, vermiculite, wood ash, cellulose fiber, crushed cork, shredded textile fabric, shredded polyethylene, sawdust, fiber glass, mineral wool, shredded fiberboard, shredded cardboard, shredded paperboard, lint, cotton, gauze, shredded tissue paper, shredded paper towel, silica gel, calcium chloride, and magnesium perchlorate.

8. A pouch according to claim 7, wherein the cushioning and absorbent material is shredded cellulose.

* * * * *